T. O. PERRY.
AIRCRAFT.
APPLICATION FILED JULY 11, 1918. RENEWED FEB. 20, 1920.

1,345,101.

Patented June 29, 1920.
6 SHEETS—SHEET 1.

INVENTOR;
Thomas O. Perry.

UNITED STATES PATENT OFFICE.

THOMAS O. PERRY, OF OAK PARK, ILLINOIS.

AIRCRAFT.

1,345,101.                Specification of Letters Patent.        Patented June 29, 1920.

Application filed July 11, 1918, Serial No. 244,506. Renewed February 20, 1920. Serial No. 360,069.

*To all whom it may concern:*

Be it known that I, THOMAS O. PERRY, a citizen of the United States, residing at 324 North Euclid Ave., Oak Park, in the county of Cook and State of Illinois, have invented a new and useful Aircraft, of which the following is a specification.

My invention relates to improvements in the class of aircrafts known as "helicopters" and consists in additions to and modifications of the apparatus shown in my pending application Serial No. 135,007, filed Dec. 4, 1916, entitled Air-craft for mechanical flight and automatic soaring; and the objects of my improvements are, first, to provide a more convenient arrangement of hand grips whereby the various controls may be easily manipulated; second, to provide means whereby the same wings may be actuated by either one of two motors independently, or by both motors acting conjunctively; third, to provide against shock while descending vertically at low speed or no speed; and fourth to simplify the construction of various parts and reduce cost of construction.

I attain these objects by the mechanism illustrated in the accompanying drawing, in which—

Similar numerals refer to similar parts throughout the several views.

The spinal supporting column 30 is tubular in form, made of thin sheet metal and normally vertical. The wing drums 31, 31 are also made of thin sheet metal, are tubular in form and encircle the upper portion of the spinal column one over the other. These drums have flanges 32 at their upper ends provided with rollers 33 and 34 adapted to roll within confining drum races 35 in the form of channeled rings secured to the spinal column. The rollers 33 center the flanges 32 on the column and the rollers 34 fix the position of the drums longitudinally while permitting the drums to revolve about the column. Secured to the base of each drum is a flanged gear wheel 36 having internal teeth adapted to mesh with the drum pinions 37 and 38 which project through openings in the column inside of which they have their bearings secured thereto. A square truss-plate 39 of sheet metal is secured externally to each of the internal gear wheels. Drum struts 40 rigidly connect the corners of the drum plates with the upper drum flanges 32 just beneath the rollers 34. Two pivot blocks 41 having fixed pivot pins 42 are secured to each of the drum flanges 32 on diametrically opposite sides and each pivot pin 42 loosely pierces a threaded wing nut 43, the nut being confined longitudinally between the pivot block and a head on the pin.

Figures 1, 2, 3:
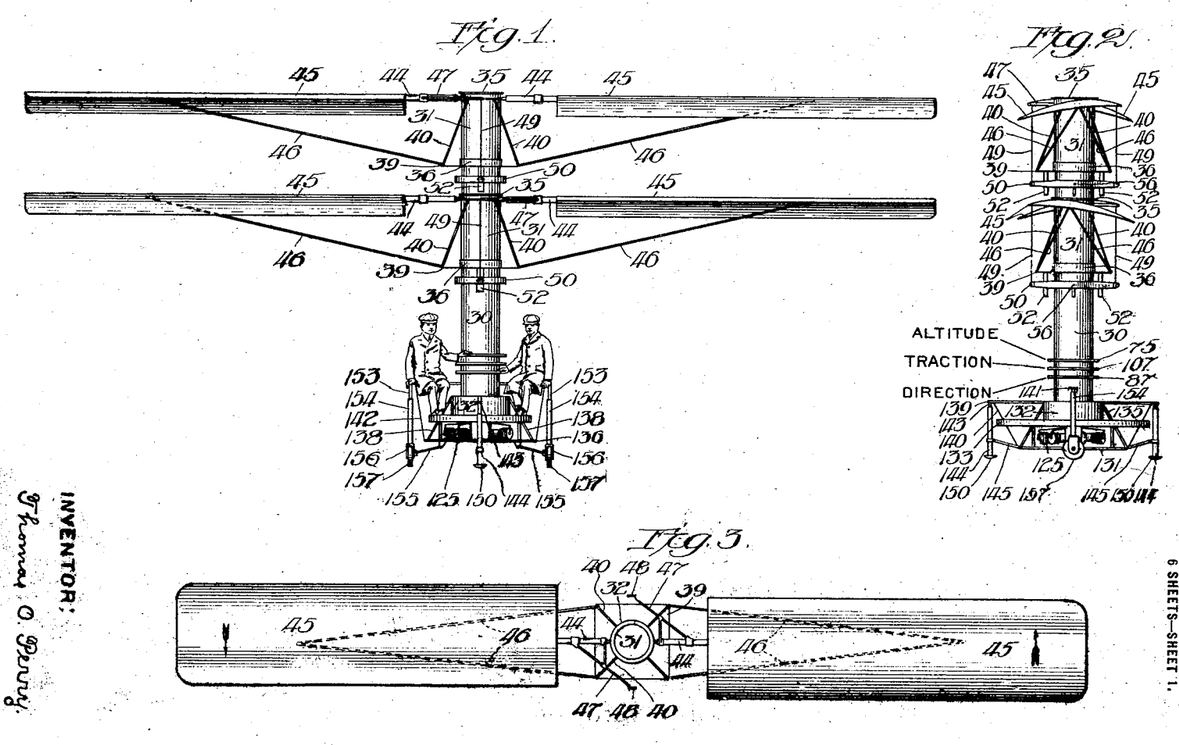
Figure 1 is a front elevation of the whole apparatus completely assembled.
Fig. 2, a side view in elevation of the assembled machine.
Fig. 3, a plan of the upper set of wings attached to their supporting drum.
Figure 4:
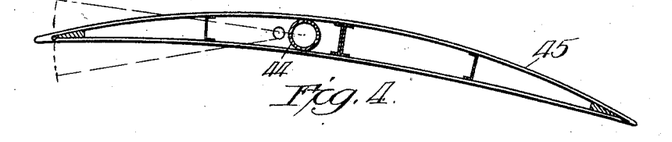
Fig. 4, a transverse section of any one of the wings on an enlarged scale.
Figures 5, 6:
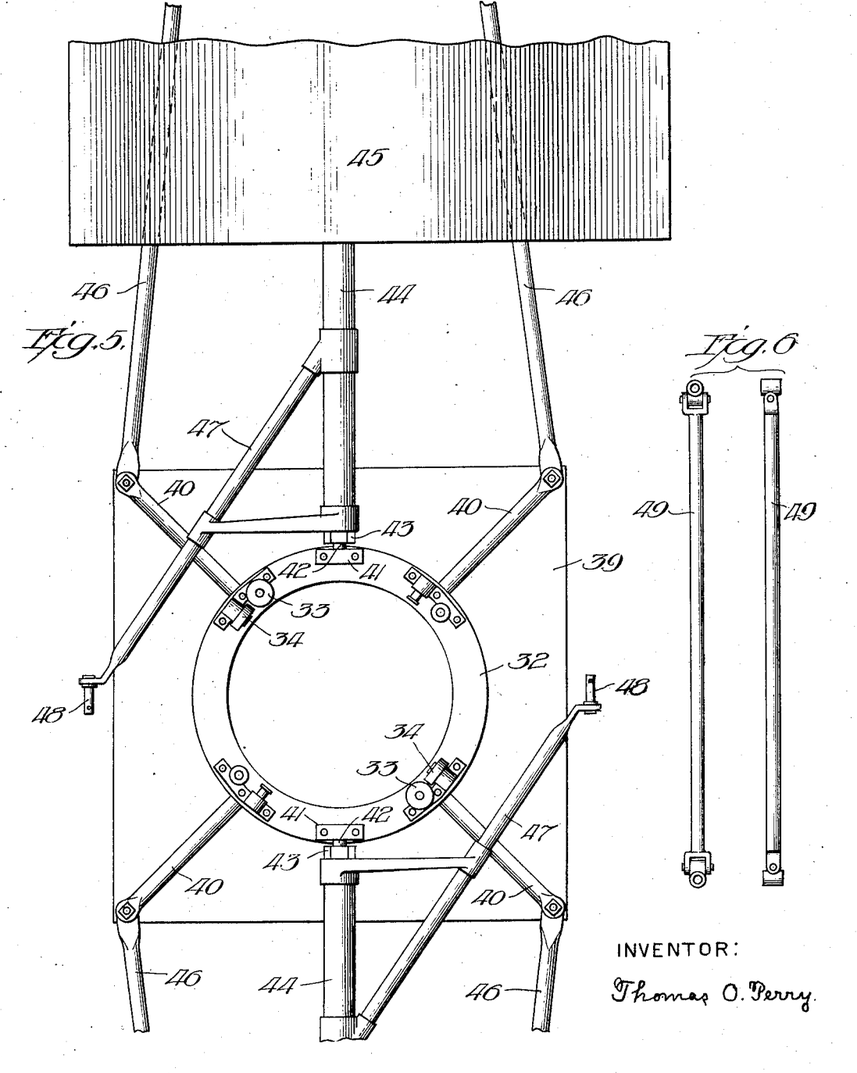
Fig. 5, an enlarged plan of the upper wing drum showing one of the wings attached.
Fig. 6, two views of one of the wing links.

The wing arms 44 are made of light tubing of considerable diameter their inner ends screwing on to the wing nuts 43 so as to have pivotal connection with the drum flanges 32. The wings 45 have a light frame work rigidly secured to the tubular wing arms the whole being covered with suitable canvas. The outer extremities of the wings extend some distance beyond the outer ends of the wing arms. Wing stays 46 converge from the widely separated corners of the truss plates 39 to a point on each wing just in front of the outer end of each wing arm where the connection is made flexible so as to permit feathering of the wings. Wing levers 47 are rigidly secured to the inner ends of each wing arm and extend diagonally therefrom terminating in wing cranks 48 which have their locations outside the peripheries of the wing drums in vertical planes which centrally intersect the drums at right angles to the wing arms as shown in Figs. 3 and 5. Wing links 49 have universal joints at both ends and pivotally connect the cranks of each set of wings with opposite ends of a feathering ring 50 located beneath each drum. Guide rollers 51 on the feathering rings engage vertical feathering guides 52 which rigidly depend from the truss plates 39.

Each feathering ring 50 carries two sets of rollers 53 and 54 which travel in the channel of a feathering race 55, the rollers 53 bearing against one or the other of two parallel flanges separated from each other by about the diameter of the rollers and the rollers 54 bearing against the web which unites the two flanges forming therewith the channel open around the outer periphery of each feathering race.

Each feathering race 55 is supported at diametrically opposite sides on a pivot rod 56 which passes through vertical slots 57 in the spinal column. Each pivot rod 56 is supported in pivot bearings 58 close against the inner wall of the spinal column on opposite sides and these pivot bearings have feathering pillars 59 and 60. The upper set of pivot bearings, joined by the cross bar 61, rest on the pillars 59 which converge downward and terminate in a direction nut 62 carried by the direction screw 63 at the upper end of the feathering shaft 64. This feathering shaft 64 is itself supported by an equalizing nut 65 adapted to receive the equalizing screw 66 forming a part of the feathering shaft. The equalizing nut 65 has trunnions which pivot in the split feathering lever 67 midway between its extremities. One end of the feathering lever has a fulcrum 68 attached to the inner wall of the spinal column and the other end is connected by means of double feathering links 69 with a trunnioned altitude nut 70 adapted to travel vertically on the altitude screw 71 which has a bearing 72 at its lower end attached to the inner wall of the spinal column. Fixed to the altitude screw just above the bearing 72 is an altitude pinion 73 which engages through a slot in the spinal column an internal altitude grip gear wheel 74 whose teeth surround and loosely bear against the outer surface of the column and to which is attached the altitude hand grip 75. A collar 76 on the lower end of the altitude screw prevents vertical displacement of the screw.

The lower set of pivot bearings 58 rest upon the supporting pillars 60 which converge downward to a guide 77 adapted to slide vertically on the lower part of the feathering shaft. Cross plates 78 unite the upper ends of the pillars 60 and have bolted between their lower edges a split bearing 79. Collars 80 on the feathering shaft prevent longitudinal movement of the shaft within the bearing. The pillars 59 and 60 are made of sheet metal with sides bent at right angles to the connecting web and the lower pivot rod passes through slots in the webs of the pillars 59.

The feathering shaft has at its lower end a terminal 81 which is square in cross section adapted to slide vertically in the journal 82 of the direction gear 83, the upper end of the journal having a square opening to fit the square terminal loosely. The direction gear 83 is underneath the split bracket 84 which spans the spinal column and forms a bearing for the journal 82 whose upper end has a shoulder resting on the upper end of the bracket bearing. The direction pinion 85 meshes with the direction gear 83 and also engages the direction grip gear 86 in the same manner as altitude pinion 73 engages altitude grip gear 74. The direction pinion 85 turns on a headed pin fixed in the split bracket 84. The direction hand grip 87 is attached to the outer rim of the grip gear 86.

The forked traction arms 88 are similar in construction and disposition to those shown in my previous application, Serial No. 135,007, but the traction bars 89 are made double so that the forks of the arms are secured between the bars by means of rivets and the bars are not made longer than the internal diameter of the spinal column. The feathering races are secured to the ends of the traction bars by means of square pins 90 which are inserted through square holes in the web of each feathering race and driven into closely fitting grooves formed between the ends of the double bars. The square pins may be further secured by pieces of coarse wire 91 driven through the pins transversely just inside of the race webs. These square pins are used in pairs at each end of the bars and pass through long vertical slots 92 on opposite sides of the spinal column which allow the feathering races to be tipped on their pivot rods as well as to be moved bodily up and down. The pivot rods 56 pierce the traction bars at right angles thereto and have their ends secured to the feathering race webs by means of feathering blocks 93 which fill in between the spinal column and feathering races to which they are fixed by screws.

The rollers 94 at the ends or the traction arms travel vertically in the traction ways 95 in the same way as shown in my previous application above referred to and the paralleling links 96 and 97 with their supporting bracket 98 are substantially the same as previously shown, except that, instead of a single traction lever 99, two traction levers are used, one on each side of the traction bracket being fixed to the two links 96. Also two traction links, 100, extend downward from the ends of the traction levers and connect pivotally with the traction nut 101 one on either side of the traction screw 102 whereon the nut is adapted to travel vertically. The traction nut 101 engages the links by means of trunnions whose lateral extensions are guided vertically by trunnion guides 103. In the same manner, trunnion guides 104 confine the trunnions of the altitude nut 70 to movement up and down. The traction screw 102 has a traction pinion 105 fixed to its lower end which is manipulated by means of the traction gear wheel 106 and traction hand grip 107 both encircling the spinal column, in the same manner that the altitude and direction pinions are manipulated. The bearing bracket 108 attached to the spinal column permits rotation of the traction screw but prevents vertical displacement because of the collar 109 on the screw shank between which and the traction pinion the bracket is placed.

The motive pinion 110, having spur teeth, is centrally located at the base of the spinal column and journaled between vertical bearings 111 which are held by upper and lower bearing plates 112 and 113 rigidly secured to each other by strong bolts 149 inclosed by spacing blocks 114 of cylindrical form. The upper bearing plate 112 is fixed to the base of the spinal column by means of angle-irons 115 and its circular periphery projects considerably outside of the column. These bearing plates also support other vertical bearings 116 between which are journaled the motive gears 117 and counter-gears 118. The motive gears directly engage the motive pinion and the counter-gears mesh with the inter-gears 119 which are fixed to the motive gears.

The drum pinions 37 and 38 have their bearings respectively in bearing rings 120 and 121 fixed to the interior wall of the spinal column both above and below each set of pinions. Vertical connecting shafts 122 extend from the motive gears to the lower drum pinions 38 the protruding gear journals joining the shafts in couplings 123. In a similar manner the counter-gears connect with the upper drum pinions 37 by means of the vertical shafts 124.

Figure 11:
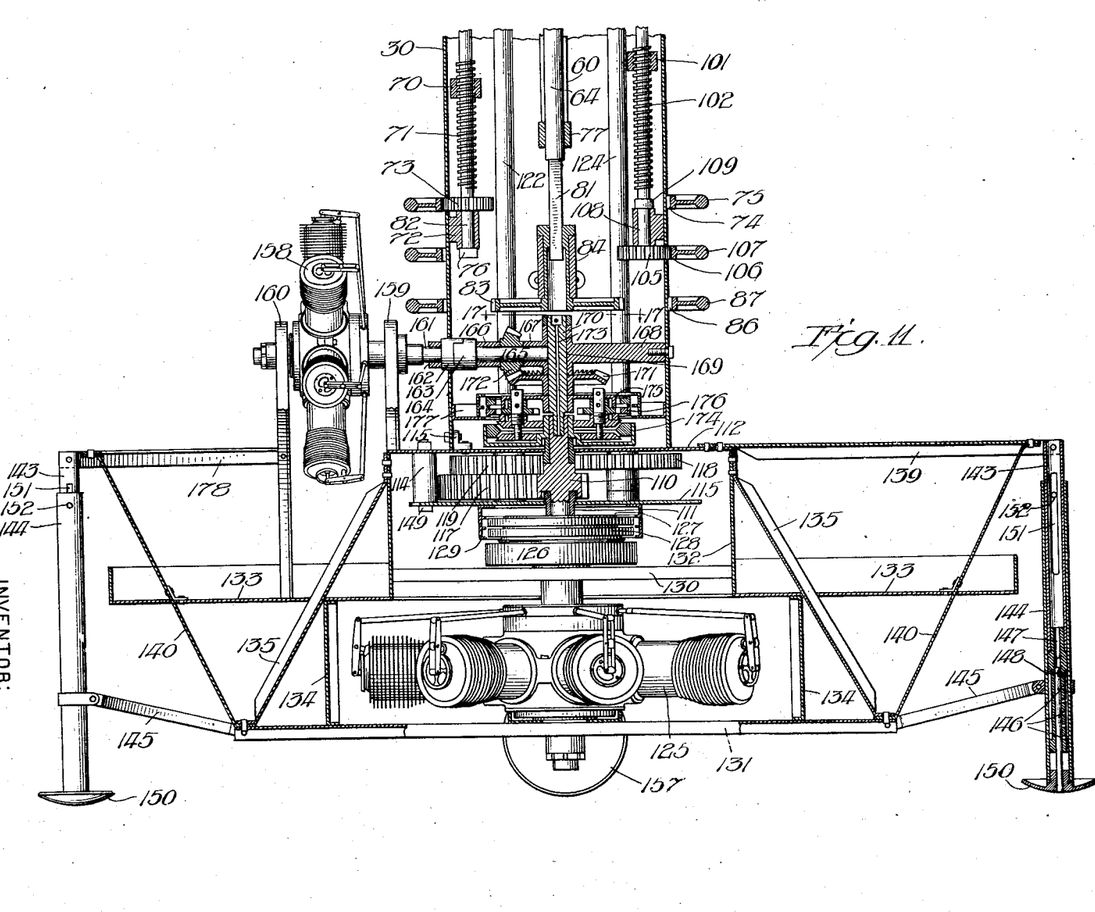
Fig. 11, a vertical side elevation of the lower end of the spinal column showing attached thereto the pilot's platform, the actuating motors, main driving gears, landing buffers and other parts.
Figures 12, 13, 14, 15, 16, 17, 18:
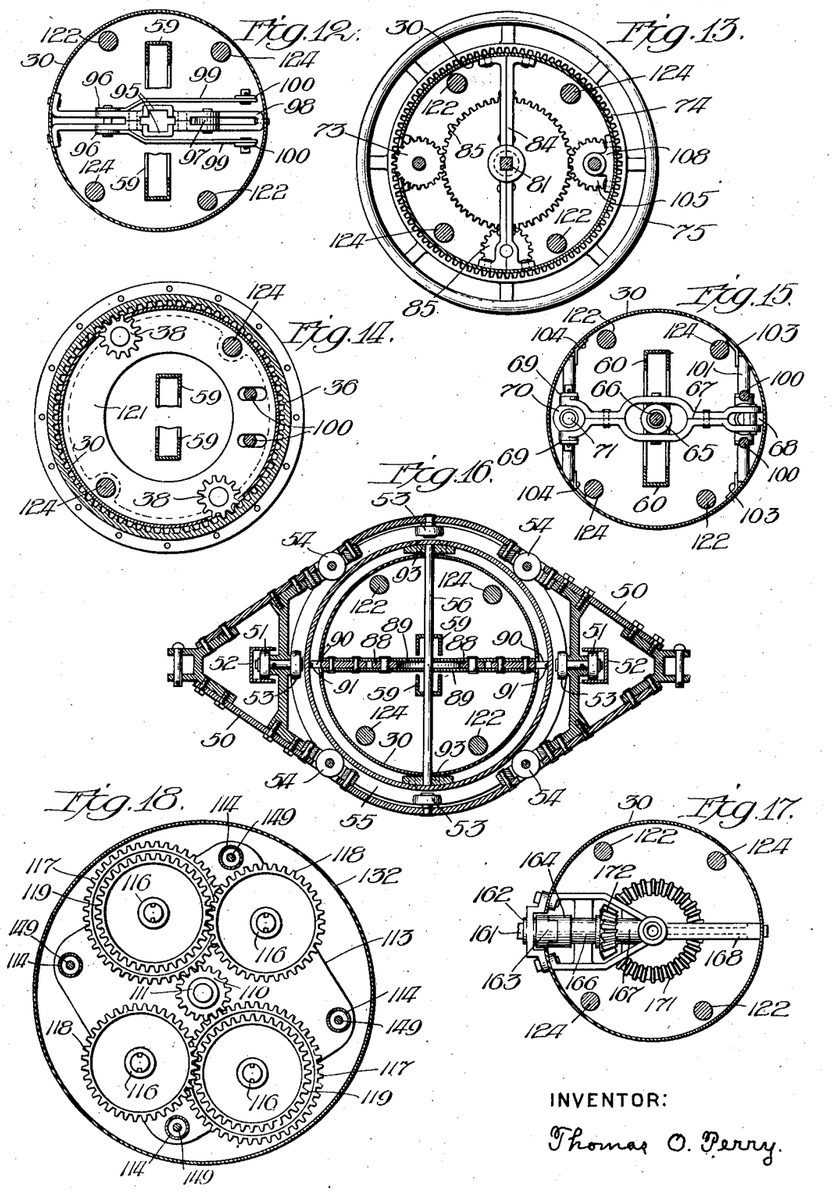
Fig. 12, a sectional plan taken at 12—12 on Fig. 7.
Fig. 13, a sectional plan taken at 13—13 on Fig. 9.
Fig. 14, a sectional plan taken at 14—14 on Fig. 9.
Fig. 15, a plan of the feathering lever and associated parts.
Fig. 16, a sectional plan of the feathering ring and feathering race with associated parts, taken through the pivotal axis.
Fig. 17, a sectional plan taken at 17—17 on Fig. 11.
Fig. 18, a plan of the motive pinion and main gear wheels taken beneath the upper bearing plate. All the figures from Fig. 4 to Fig. 18 inclusive are enlarged six fold as compared with Figs. 1 to 3.

The primary motor 125, preferably of the revolving cylinder type, revolves about a vertical axis in line with the axis of the motive pinion with which the motor may be directly connected as shown in my previous application No. 125,007. Preferably, however, connection between the primary motor and motive pinion is made disconnectible by means of a clutch which may be of any suitable known construction. The particular form of clutch 126—127—128 shown in Fig. 11 is fully described in my pending application No. 244,509 and need not be further described here than to say that it consists of three principal parts, one part 126 carried by the motor, a second part 127 carried by the pinion and a third manipulative part 128 adapted to engage or disengage the other two parts and cause them to adhere with varying degrees of cohesion. A circular shield 129 incloses partly some of the manipulative mechanism.

The primary motor has its bearings in upper and lower channel bars 130 and 131. The upper channel bar 130 is fixed diametrically to the inner wall of a cylindrical housing 132 which has the upper bearing plate 112 for a supporting head. The pilot's platform 133 is fixed exteriorly to the base of the cylindrical housing and the lower channel bar is suspended from the pilot's platform by means of the posts 134. The outer ends of the lower channel bar which project beyond the feet of the posts are connected with the upper end of the cylindrical housing by diagonal braces 135 stayed about midway by piercing the pilot's platform near its junction with the posts. A cross channel bar 136 joins the lower channel bar in the form of a cross at right angles thereto and is similarly supported by posts 137 and braces 138. Fore and aft channel bars 139 extend from the top of the cylindrical housing 132 to points horizontally farther out than the ends of the lower channel bar 131 and have their outer ends tied thereto and to the feet of the braces 135 by tie-bars 140. Lateral channel bars 141 likewise extend from the spinal column near its base to points horizontally farther out than the ends of the cross channel bar 136 and have their outer ends tied thereto and to the feet of the braces 138 by tie-bars 142. These channel bars 141 are made broad enough to form convenient seats for pilot and passenger.

Hollow plungers 143 depend from the extremities of the fore and aft channel bars by pivotal connections and are thrust into tubular sheaths 144 which are closed at their lower ends and retained in vertical position by guide links 145. These guide links are used in pairs widely spread where they connect with the broad channel bars and converging to their connections near the feet of the sheaths. The lower ends of the hollow plungers are somewhat reduced in outer diameter for some distance and these reduced parts have small radial perforations 146 arranged in vertical rows which communicate with central bores 147 in the plungers. These bores in turn communicate with the large cavity of the hollow plunger and receive from below stop-off rods 148 whose lower ends are fixed to the ground bumpers 150. Elongated slots 151 in the plunger tops receive loosely restricting pins 152 which diametrically pierce the tubular sheaths for limiting the movement of the plungers within the sheaths. The stop-off rod is adapted to close successively the inner ends of the radial perforations as the plunger is thrust down into its sheath. When the plunger is withdrawn from its sheath sufficiently to uncover any of the radial perforations, a passage is afforded for the flow of oil or other liquid from the interior of the hollow plunger so as to fill the space left in the sheath below the plunger. Plungers 153 and sheaths 154 similar to those described depend from the extremities of the lateral channel bars and are guided vertically in like manner by links 155 which connect with the cross channel bar 136. But the lateral sheaths 154 terminate below in forks 156 carrying wheels 157 on which the aircraft may be balanced and rolled along the ground. When the wheels are on the ground the fore and aft ground bumpers can be slightly raised therefrom when grasped by hand. All of the plungers fit their sheaths with sufficient looseness so that when the aircraft leaves the ground the sheaths by their own weight settle down to the lowest limit allowed by the slots 151 and restricting pins 152.

To relieve or supplement the direct connected primary motor 125, a reserve motor 158 having a horizontal axis may be mounted over the rear part of the pilot's platform between two bearings in upright standards 159 and 160, the forward standard 159 standing fixed to the upper bearing plate 112 and the rear standard being fixed to the pilot's platform. The reserve motor shaft 161 also has a thrust bearing 162 bolted against the spinal column and close against this thrust bearing the motor shaft has a notched coupling 163 protruding through an opening in the wall of the column within which it engages a similar coupling 164 carried by a short shaft 165 having two horizontal bearings 166 and 167 which form part of a bracket 168 fixed to the inner wall of the spinal column. The bracket 168 also has a long vertical bearing 169 in which is journaled a short vertical shaft 170 carrying the bevel gear wheel 171 which engages the bevel pinion 172 mounted on the short horizontal shaft 165 between the bearings 166 and 167. Vertical displacement of shaft 170 is prevented by a collar on its upper end holding up the bevel gear against the lower end of the vertical bearing. The lower end of shaft 170 is reduced in diameter and protrudes loosely into the upper end of the upwardly protruding journal of the motive pinion 110 so as to insure exact alinement, and to facilitate lubrication of this reduced shaft end the shaft has a small longitudinal bore 173. The lower end of shaft 170 is made to engage or disengage the upper journal of the motive pinion for actuating purposes by means of a clutch 174—175—176, here shown sectionally, which is precisely similar to the lower clutch 126—127—128 above mentioned. The inclosing shield 177 is attached to the inner wall of the spinal column and is the same as the lower shield 129 except that the latter is attached to the lower bearing plate 113. In place of the aft channel bar previously described, horizontal braces 178 diverge from their connection with the after tubular plunger to opposite sides of the rear standard 159 when the reserve motor is used.

Figures 7, 8:
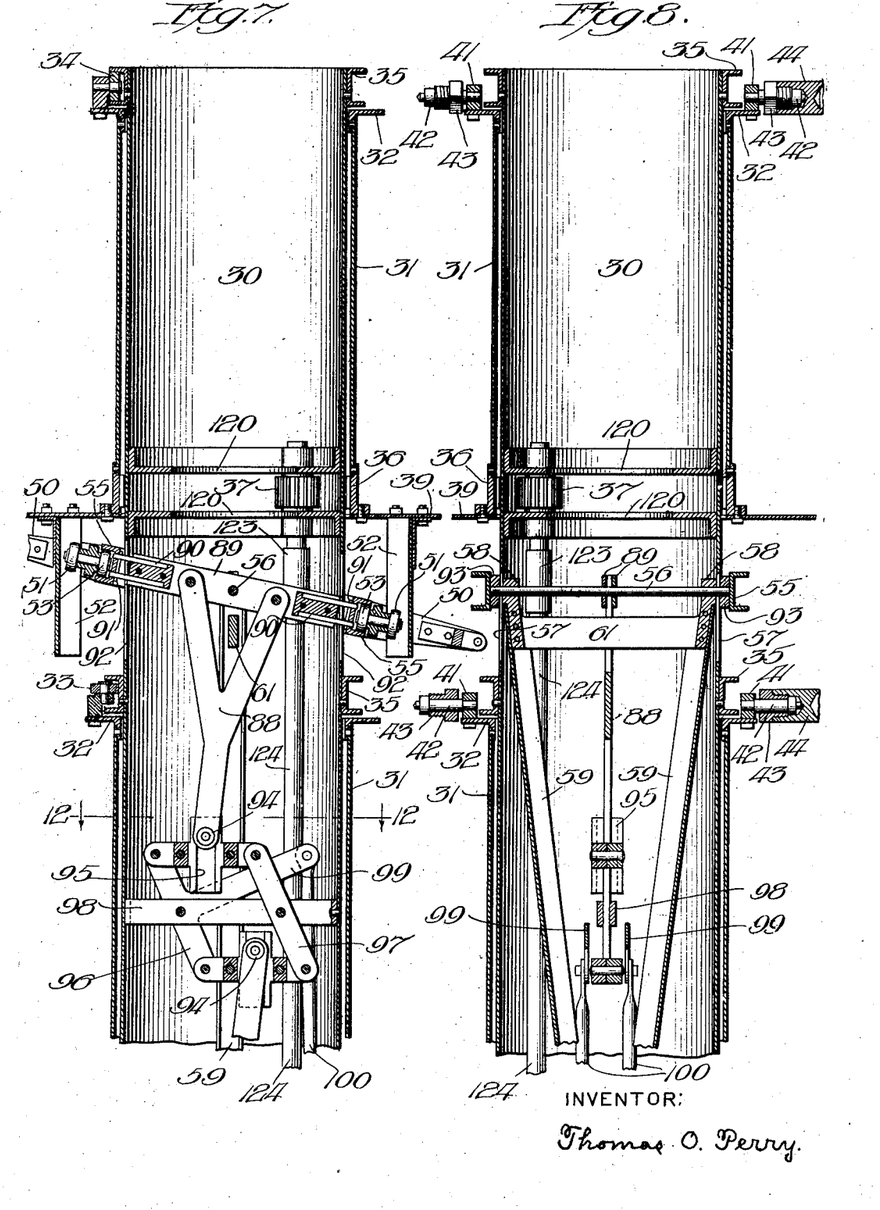
Fig. 7, a sectional side elevation of the upper part of the central spinal column showing the upper wing drum, a part of the lower wing drum and various other parts immediately connected.
Fig. 8, a sectional front elevation of the same or corresponding parts as shown in Fig. 7.
Figures 9, 10:
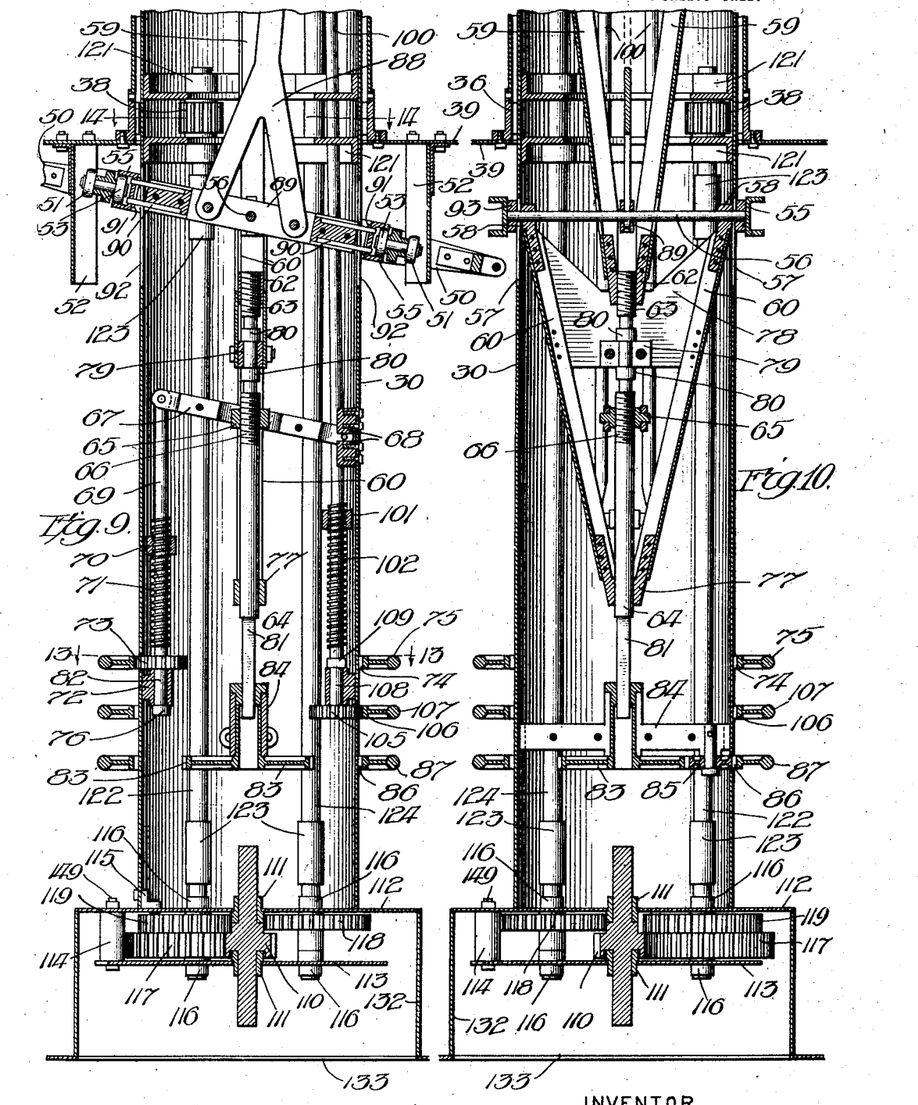
Fig. 9, a vertical side elevation of the central spinal column continued downward from Fig. 7 with immediately connected parts.
Fig. 10, a sectional front elevation of the same or corresponding parts as shown in Fig. 9.

From the construction shown in Figs. 7 and 9, it is evident that the feathering races 89 may be simultaneously tipped about the pivot rods 56 in either direction by giving the traction grip 107 a right hand or left hand turn, without interfering with the vertical movements which they may have at the same time through similar manipulation of the altitude and direction grips. Both feathering races are tipped equally and in the same direction as shown. The pivot rods 56 are both located in a vertical plane which stands at right angles to the direction of propulsion or travel, and propulsive effort of the revolving wings is directed toward the lower sides of the feathering rings when tipped. This direction of propulsive force is due to the fact that the wing links which control the weather angles of the wings are located in vertical planes at right angles with the arms, or axes of the wings. The vertical slots 92 are long enough to allow the feathering races to tip as required. The slots 57 allow the feathering rods to move up and down in them as guides. The feathering rings revolve around and tip with the feathering races by reason of the rollers 51 engaging the feathering guides 52 depending from the truss plates 39. The feathering races do not revolve and are always tipped toward the direction of travel. When the feathering rings are tipped from horizontal position, the wing links move up and down while traveling around the vertical column. This causes the wings, while moving rearward with reference to the course, to have greater weather angles than when traveling forward, or causes a continuous feathering of the wings as they revolve, which reduces head resistance while at the same time producing tractive force. This continuous feathering of the revolving wings during travel along a straight course also serves to equalize the lift, or upward thrust due to reaction against the air, which otherwise would vary exceedingly during each wing revolution.

As the propulsive effort due to continuous feathering of the wings acts near the top of the vertical column, this effort tends to tip the top of the column forward in the proper direction and as required for increasing the propulsive force through a volplaning action due to inclination of the machine as a whole, though the volplaning may be accomplished without actual descent, since the lifting force of the revolving wings is under control through manipulation of the altitude grip which feathers all of the wings in unison more or less as required. Evidently also, the amount of volplaning inclination forward is under control through manipulation of the traction grip without the necessity of the pilot shifting either himself or any of his load. While traveling at any considerable speed, a shift of the feathering races to horizontal positions would quickly cause a reverse tipping of the whole machine.

When the altitude grip 75 is manipulated, the feathering races are both moved vertically up or down without change of their relative distance from each other, thus feathering all four of the wings equally. This provides for control of altitude independently of any change in motor speed.

When the direction grip 87 is turned in a right hand direction, the feathering shaft 64 is given a left hand turn and causes the two feathering races to recede from each other. A left hand turn of the direction grip causes the two feathering races to relatively approach. In one case the upper set of wings experiences a relative increase of weather angle, and in the other case the weather angles of the lower wings are relatively increased. This is called differential feathering, which causes the craft to turn to right or left because one or the other sets of oppositely revolving wings, when so feathered, experience greater torsional resistance than the other set. In the first case the craft turns to the right and in the second case it turns to the left. As the propulsion due to continuous feathering is fixed in direction with reference to car, the turning of the craft to right or left likewise changes the direction of the propulsive force.

The directive action described above has involved only the direction screw 63. The equalizing screw 66 would cause the lower feathering race to move up or down without actually moving the upper race if the direction and equalizing screws both had the same pitch. But since the pitch of the direction screw is twice that of the equalizing screw, both feathering races will move equally, but in opposite directions, so as to reduce the weather angle of one set of wings in the same proportion that the angle of the other set is increased. Thus the aggregate lift of all the wings is less disturbed by the differential feathering for steering.

The broad features of actuation and control in this structure, aside from the addition of a reserve motor, are substantially the same as set forth in my previous application above mentioned.

A considerable variation from previous construction consists in manipulating the three principal controls by means of three superposed hand grips which encircle the spinal column so that they can be grasped equally well from any side of the column and these hand grips all produce within the column the necessary up and down movements through the agency of screws and nuts which hold the controlling links wherever placed without the necessity of having locking devices. Otherwise the altitude and traction control movements are the same as before, though a feathering ring has been interposed between the feathering race and the wing links, thus making feasible the use of longer wing levers and permitting a reduction in diameter of the feathering race. Besides, the inequality of strains in opposite wing links is sustained more directly by the feathering ring thus reducing the effort required in effecting these controls. The relative feathering for direction is effected more directly than before as the pillars 59 directly connect the upper pivot bearings 58 with the direction nut 62 and the direction gear wheel 83 has only a single spur pinion 85 interposed between itself and the internal grip gear 86.

The vertical driving shafts 122 and 124 are here carried up inside of the spinal column instead of outside as in my former structure. This involves a slight enlargement in diameter of the spinal column but reduces considerably the diameters of the wing drums, and makes it unnecessary to provide special safety shields around the lower parts of the shafts.

The truss plates at the bases of the wing drums insure against distortion of the internal drum gears and also serve to more widely separate the feet of the wing stays as well as to reduce their length. The addition of the drum struts 40 transmits vertical thrust, due to weight carried, directly to the drum rollers 34 which sustain the spinal column by suspension from the drums. The considerable spread of these plates, on account of their thinness, does not add materially to head resistance in traveling.

A reserve motor is the surest safeguard against accidents due to motor failure. The reserve motor in this case drives the same motive pinion that is driven by the primary motor but may revolve much more rapidly than the pinion, as is determined by the diameter ratio of bevel gear wheel 171 and bevel pinion 172. Hence the reserve motor may be much lighter than the primary motor without necessarily developing less power, although less power would suffice for guarding against too precipitate descent. As the reserve motor need never work except for brief periods of time it is not likely to fail because of hard usage. The conditions of use are the best possible that a motor can enjoy. Its fuel supply of small capacity may be entirely independent of the main supply.

The independent clutching mechanisms between each motor and the central motive pinion makes it feasible for either motor to be used for starting the other, as either can be connected to or disconnected from the other at will. The reserve motor being more favorably placed for this purpose can be most conveniently used for starting the primary motor.

The combined weight of the two motors need not greatly exceed the necessary weight of motive equipment where only one motor is used, since the power required for moderate rates of travel is considerably less than that required for leaving the ground vertically in calm weather. Both motors may be used to lift the aircraft from the ground when extra power is required and afterward the primary motor alone may suffice without being made large enough for extreme conditions of use. The saving of fuel may overbalance some possible addition in weight of the two motors.

Altitudinal position can be more readily controlled by feathering the wings than by regulating the speed of the motor. Tractional effort is also controllable without change of motor speed. Therefore the motor need not be shut off or slowed down when a landing is made. It is a great advantage to be able to quickly rise again upon too close approach to unfavorable ground. This promptness of altitudinal control is the surest means of avoiding damage from too sudden contact with the earth.

Yet, in spite of all precautions, shocks cannot always be avoided. Therefore I have provided specially efficient buffers made available because only shocks in a vertical direction need to be guarded against. The plungers 143 and 153 have a considerable range of vertical movement which is reduced in speed as the plungers are driven deeper into their sheaths by the successive closing of the radial perforations through which oil must escape from beneath the plungers. The amount of resistance to plunger motion is regulatable by the size and number of the radial perforations and may be made as great throughout the stroke as the strength of structure will permit. So the absorption of shocks is made the greatest possible within the range of movement and there is effectual avoidance of any tendency to rebound. In my former application above mentioned, it is recognized that in case of motor failure the resistance of the air to rapid descent may be increased by setting the wings at their zero weather angle and revolving them by hand. Since then, experiments have demonstrated that if the wings are set at their zero weather angle before they slow down too much through motor failure, they will continue to revolve rapidly, in the same direction as before driven, by the rush of air against their under surfaces due to ensuing descent, and that their resistance to descent when thus naturally propelled by wind will be greater than would be afforded by a flat solid disk of the same diameter as the extreme spread of the wings. The resistance thus afforded by even one set of revolving wings measuring 36 feet from tip to tip would be about 1600 pounds before the rate of vertical descent reached twenty miles per hour, a speed not dangerous to the life of the pilot nor likely to involve personal injury. This natural wind actuated motion will continue in the same direction even if the weather angle of the wings is changed in either direction from zero as much as three degrees. If the revolutions should at any time be arrested during descent, the wings can be again set in motion by temporarily adjusting their weather angles to negative inclinations. Moreover, directional control remains effective in the same manner, by feathering the wind-driven wings, as when they are driven by the motor, so that no other means of direction need be provided in any case, not even for the purpose of volplaning.

For stabilizing purposes, the revolving wings, however driven, are more effective than a solid disk of the same diameter. Mere extent of surface which accrues in effect through revolution has a dampening effect on any tendency to oscillation and the lateral resistance to slippage is greatly increased in every direction. Oscillations in the plane of travel are controllable by manipulation of the traction grip, as by this means the propulsive efforts of the wings are varied in a fore and aft direction. If anything more than the revolving wings are needed to prevent side slipping, the well known recourse to longitudinal fins above is available, as they can easily be fixed to the top of the spinal column. The gyroscopic resistance of the revolving cylinder motor also puts a damper on pendulum-like oscillations.

I claim:

1. In an aircraft, the combination with wings radially pivoted, motive power adapted to drive said wings horizontally about a vertical axis and a tubular vertical column upon which said wings have their bearings, of feathering mechanism for said wings partially inclosed within said vertical column and superposed circular hand grips encircling said column adapted to actuate said inclosed feathering mechanism for controlling the altitude, traction and direction of said aircraft substantially as herein set forth.

2. In an aircraft, the combination with radially pivoted wings, a vertical tubular column upon which said wings have their bearings and motive power adapted to revolve said wings horizontally about the vertical axis of said column, of feathering mechanism for said wings partially inclosed within said colunm, feathering races encircling said column operatively connecting with said inclosed mechanism, feathering wing links in swivel connection with said feathering races, and superposed hand grips encircling said column adapted to actuate said inclosed feathering mechanism for controlling the altitude, traction and direction of said aircraft, substantially as herein set forth.

3. In an aircraft, the combination with two sets of radially pivoted wings adapted to revolve horizontally in opposite directions about a vertical axis, a vertical tubular column upon which said sets of wings have their bearings and a motor adapted to actuate said wings, of feathering mechanisms for said wings partially inclosed within said column, feathering races encircling said column operatively connected with said inclosed mechanisms, feathering rings swiveled upon said races, feathering links between said rings and said wings and superposed hand grips encircling said column adapted to actuate said inclosed feathering mechanisms for controlling altitude, traction and direction of said aircraft, substantially as herein set forth.

4. In an aircraft, the combination with two sets of radially pivoted wings adapted to revolve in opposite directions about a vertical axis, a vertical tubular column on which said sets of wings have their bearings and mechanism for feathering said wings to control altitude, traction and direction, of a primary motor adapted to revolve beneath said column about a vertical axis, a spur pinion driven from beneath by said primary motor and adapted to drive a plurality of spur gears, shafts extending upward from said spur gears to actuate said sets of wings, a clutch connection between said primary motor and said pinion, a secondary motor adapted to drive said pinion from above, clutch connection between said secondary motor and said pinion, and means whereby either or both motors may be connected or disconnected from said pinion, substantially as herein set forth.

5. In an aircraft, the combination with horizontally revolving wings having their bearings on a vertical tubular column, a spur pinion centrally located at the base of said column, spur gear wheels engaging said pinion and shafts extending upward from said gear wheels for actuating said wings, of a primary motor adapted to drive said pinion from beneath, a secondary motor adapted to drive said pinion from above and clutch connections between said pinion and each of said motors whereby either motor or both may be independently connected or disconnected from said pinion, substantially as herein set forth.

6. In an aircraft, the combination with horizontally revolving wings having their bearings on a vertical tubular column, a spur pinion centrally located at the base of said column, spur gear wheels engaging said pinion, and shafts extending upward from said gear wheels for actuating said wings, of a primary motor adapted to drive said pinion from beneath, a secondary motor adapted to drive said pinion from above and clutch connection between said pinion and one of said motors whereby one may be held in reserve for emergency use, or both may be simultaneously used, substantially as herein set forth.

7. In an aircraft, the combination with horizontally revolving wings, a supporting vertical column having bearings for said wings at or near its upper end, a motor at the base of said column adapted to actuate said wings and means for controlling descent in a truly vertical direction, of vertical buffer sheaths closed at their lower ends and partially filled with liquid, central stop-off rods projecting upward from the closed ends of said buffer sheaths and hollow pistons adapted to close the upper ends of the buffer sheaths, each piston having at its lower end leading from its exterior to its interior a succession of superposed perforations, for restricted passage of liquid, which the stop-off rod is adapted to successively close as the piston is forced into the buffer sheath, substantially as herein set forth.

8. In an aircraft, the combination with horizontally revolving wings, a supporting vertical column having bearings for said wings at or near its upper end, a motor at the base of said column adapted to actuate said wings and means for controlling descent in a truly vertical direction, of vertical buffer sheaths closed at their lower ends and partially filled with liquid, hollow plungers depending from the aircraft and adapted to be thrust down into said sheaths from above, a succession of restricted passages for flow of liquid from below into the interior of said plunger and stop-off mechanism for successively closing said restricted passages, substantially as herein set forth.

9. In an aircraft, the combination with radially pivoted wings adapted to revolve horizontally about a vertical axis, motive power adapted to actuate said wings and a central supporting column, of one or more wing drums encircling said column with bearings thereon for carrying said wings, pivotal connection with the wings at the upper end of the drum, an internal driving gear at the base of the drum, a reinforcing drum plate rigidly secured around said internal driving gear with broad lateral expanse, drum struts diverging from the upper end of said drum to widely separated connections with the periphery of said drum plate and wing stays diverging from a remote part of each wing to the connections between said struts and said drum plate, substantially as herein set forth.

10. In an aircraft, the combination with two sets of radially pivoted wings adapted to revolve horizontally in opposite directions about a vertical axis, motive power for actuating said wings and a central supporting column, of superposed wing drums encircling said column with bearings thereon for carrying said wings, pivotal connections with the wings at the upper ends of said drums, internal driving gears at the lower ends of said drums, reinforcing drum plates rigidly secured around said internal gears with broad lateral expanse, drum struts diverging from the upper ends of said drums to widely separated connections with the peripheries of said drum plates and wing stays diverging from remote parts of said wings to the connections between said struts and said drum plates, substantially as herein set forth.

11. In an aircraft, the combination with radially pivoted wings adapted to revolve horizontally about a vertical axis, motive power to actuate said wings and a central supporting column, of one or more wing drums encircling said column with bearings thereon for carrying said wings, pivotal connections with the wings at the upper ends of the drums, internal driving gears at the base of the drums, drum plates extending from the bases of said drums to points radially distant, drum struts diverging from the upper portions of said drums to said radially distant points of the drum plates and wing stays diverging from remote parts of the wings to the connections between said struts and said drum plates, substantially as herein set forth.

12. In an aircraft, the combination with radially pivoted wings adapted to revolve horizontally about a vertical axis, motive power to actuate said wings and a central supporting column, of one or more wing drums encircling said column with bearings thereon for carrying said wings, pivotal connections with the wings at the upper ends of the drums, internal driving gears at the base of the drums, drum plates extending laterally from the bases of said drums to points radially distant, drum struts diverging from the upper portions of said drums to said radially distant points of the drum plates, wing stays diverging from remote parts of the wings to the connections between said struts and said drum plates, feathering races capable of vertical displacement encircling said column beneath said drum plates, feathering mechanism partially inclosed within said column adapted to vertically displace said feathering races, elongated feathering rings swiveled upon said races, widely separated wing links connecting opposite parts of said feathering rings with said pivoted wings and one or more feathering ring guides on said drum plates adapted to revolve said rings horizontally about said column in unison with the wings, substantially as herein set forth.

THOMAS O. PERRY.